Figure 1:
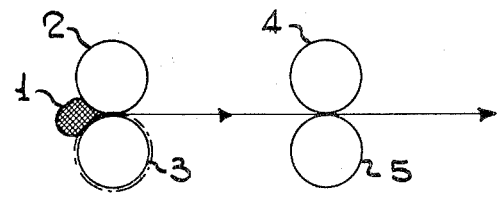

Dec. 20, 1949     W. J. SPARKS ET AL     2,491,525
SELF-SUPPORTING FILM OF STYRENE-ISOBUTYLENE COPOLYMER
Filed May 24, 1944

William J. Sparks
David W. Young    Inventors

By _____ Attorney

Patented Dec. 20, 1949

2,491,525

UNITED STATES PATENT OFFICE 2,491,525

SELF-SUPPORTING FILM OF STYRENE-ISOBUTYLENE COPOLYMER

William J. Sparks, Cranford, and David W. Young, Roselle, N. J., assignors to Standard Oil Development Company, a corporation of Delaware Application May 24, 1944, Serial No. 537,186

6 Claims. (Cl. 260—45.5)

This invention relates to self-supporting films of hydrocarbon copolymer, and more particularly to substantially transparent films of a copolymer of an aliphatic olefin such as isobutylene with a polymerizable unsaturated hydrocarbon containing a cyclic nucleus, such as styrene.

U. S. Patent 2,274,749 describes copolymers of the general type referred to above, such as copolymers of isobutylene and styrene, and methods of preparing same, such as copolymerizing said reactants at a temperature below about 0° C. in the presence of an active halide polymerization catalyst, preferably in the presence of an inert volatile organic liquid serving as solvent and refrigerant. The temperature may vary considerably; for instance, it may be −10° C., −50° C., −89° C., −103° C. or even lower. By adjusting the proportions of the two raw materials, copolymers of desired hardness, melting point, plasticity, etc. may be obtained.

Instead of isobutylene other aliphatic olefins may be used, preferably having more than 2 carbon atoms and preferably iso-olefins having 4 to 8 carbon atoms, such as isopentene (methyl-2 butene-1) or a pentene obtained by dehydration of secondary amyl alcohol.

Instead of styrene other materials may be used such as indene, terpenes, etc.

The copolymerization is effected by mixing the two reactants, with or without a mutual solvent, if necessary, such as ethylene, propane, butane, methyl chloride, refined naphtha, etc., and then after the cooling the reactants to the desired low temperature, adding an active halide catalyst such as boron fluoride, or activated boron fluoride catalyst (.1% ether added), aluminum chloride, titanium tetrachloride, aluminum alkoxide-aluminum chloride complex-(AlCl$_3$.Al[OC$_2$H$_5$]$_3$) and the like. Preferably, such catalyst may be dissolved in a solvent such as carbon disulfide, a low molecular weight sulfur-free saturated hydrocarbon, a lower alkyl halide, e. g. methyl chloride or ethyl chloride or a mixture of methyl chloride with butane, at or below the boiling point of the catalyst solvent, and then the catalyst solution cooled down, filtered and added to the reaction mixture. Alternative catalysts include:

AlCl$_3$.AlCl$_2$OH, AlBr$_3$.AlBr$_2$OH, AlBr$_2$Cl.AlOCl, AlBrCl$_2$.AlOBr, TiCl$_4$.AlCl$_2$OH, TiOCl$_2$.TiCl$_4$

AlBr$_3$.Br$_2$.CS$_2$, BF$_3$.isopropyl alcohol, BF$_3$ solution in ethylene, activated BF$_3$ catalyst in ethylene solution, activated BF$_3$ catalyst in ethylene solution, activated BF$_3$ catalyst in methyl chloride solution. Volatile solvents or diluents, e. g. propane, ethane, ethylene, methyl chloride, carbon dioxide (liquid or solid), etc. may also serve as internal or external refrigerants to carry off the liberated heat of polymerization. After completion of the copolymerization, residual catalyst is killed with alcohol, for example, isopropyl and excess catalyst removed by washing the product with water and preferably also with dilute aqueous caustic soda. The resulting solid copolymer may range from a viscous fluid or a relatively stiff plastic mass to a hard resinous solid, depending upon the temperature of polymerization, the yield of polymer obtained upon the active feed, the type and concentration of catalyst, the proportion of cyclic reactant in the feed, and the temperature at which the physical texture is observed. The proportions in which the styrene and isobutylene have actually combined during copolymerization may be determined by interpolation of a carbon-hydrogen analysis between the limits:

|  | Carbon | Hydrogen |
| --- | --- | --- |
|  | Per Cent | Per Cent |
| Pure styrene | 92.3 | 7.7 |
| Pure isobutylene | 85.7 | 14.3 |

Generally the molecular weight of the product will range from about 300 upwards, for instance, to 3,000, 5,000, 25,000 or much higher, the larger molecular weights, larger intrinsic viscosity (greater than .6) and greater plasticity of polymer product at room temperature being obtained at lower polymerization temperatures, e. g. −75° C. to −103° C. and with lower content of cyclic reactant, e. g. 10%–49%; on the other hand, with relatively higher polymerization temperatures such as −40° C. or −20° C., and with higher proportion of cyclic material, e. g. 50–60% or more, the resulting copolymers are lower in molecular weight and intrinsic viscosity, and have a harder texture.

For convenience and brevity the above-described copolymer of a cyclic polymerizable material and an olefin will be referred to as a cycalkenecopol, or more simply a cycalkene. The specific type of copolymer made from styrene and isobutylene will similarly be referred to for brevity as stybucopol, or more simply stybutene. The invention will be illustrated as applied particularly to stybutene, although it is not to be limited specifically thereto.

Many resinous and plastic materials either occurring in nature or made synthetically heretofore are unsuitable for sheeting out into thin self-supporting films because they are either too brittle or have too much cold flow, etc.

For the preparation of transparent self-supporting films of stybutene according to the present invention, it is preferred to use a stybutene made in methyl chloride solution (1.5 to 3.5 volumes methyl chloride per volume active feed) at a temperature between the approximate limits of −65° C. and −103° C., using about 35% to 75%, preferably about 40% to 60%, of styrene in the styrene-isobutylene copolymer. Even with these preferred conditions, however, it is difficult to make clear, transparent films by the ordinary method of sheeting the stybutene plastic on standard rubber manufacturers' rolls.

Broadly, the process by which the films of the present invention are produced comprises sheeting of the high molecular weight styrene-isobutylene copolymer plastics, preferably under controlled conditions to give definite orientation to the copolymer molecules. According to one preferred modification, by which substantially transparent films are produced, a mechanical stress is made to act upon the copolymer molecules in the form of three dimensional forces so as to give the desired orientation to the molecules. This is preferably accomplished by sheeting the stybutene on a glassmaker's drawing equipment such as that described in U. S. Patent 2,320,115. By this machine the stybutene, which has previously been rolled into sheet form by ordinary rolls, is conveyed through a heated oven on a number of smooth rolls which also serve to support the material, these smooth rolls being driven by a frictional driving means so arranged and constructed that when the sheet material expands or contracts, slippage occurs between the driving means and the roll rather than between the roll and the sheet material. The frictional driving means is preferably a fluid drive such as that effected by tangential jets of air or water impinging on the inside walls of the smooth rolls. Such fluid may be adjusted in temperature to give the desired amount of heating or cooling, and the roll feed may to a general extent be regulated by control of the fluid pressure.

In carrying out the process the stybutene, which may have an intrinsic viscosity of 0.6 to 3, depending primarily upon the molecular weight, which in turn as explained above, depends upon the temperature of copolymerization and the proportion of styrene in the feed, should be heated well above the softening point, for instance, to a temperature of about 100–180° C., preferably in a kneader type mixer for 15 minutes or so, then given a single quick pass through a pair of ordinary smooth rolls maintained at a temperature of about 50 to 100° C. to form the stybutene into a sheet which is then immediately passed through the molecule-orienting rolls, which are preferably maintained at a temperature of about 60° C. to 20° C. The speed of passing through these special smooth rolls should be maintained generally within the approximate limits of about 1 to 18 feet per minute, although this speed of rolling is preferably controlled by polarized light, which detects by optical method the stress in the molecular structure of the sheet.

The resulting substantially clear transparent film of stybutene has a smooth surface, good strength, good electrical properties, low permeability to moisture vapors, low cold flow, and little or no surface tack. Such film may be prepared in any desired thickness such as about 0.01 inch, 0.1 inch, 0.25 inch, or even thicker, or even considerably thinner, e. g. 0.001 inch, 0.0001 inch etc. This product is highly useful for a large number of different purposes, for instance, as a thin, flexible, clear, transparent moistureproof and gasproof sheet or film for wrapping all sorts of articles such as food, metals, textile goods, chemicals, munitions, guns, tobacco, batteries, etc., to protect them against moisture, air or other harmful vapors. Such films have exceedingly good resistance to moisture penetration, and are not only good for protecting articles against moisture, but conversely they also may be used for wrapping materials or articles to prevent them from losing vapors, e. g. drying out, etc.

For making such films having good flexibility for use as a wrapping sheet material, it is preferred to use the stybutene made at a temperature between the approximate limits of −70° C. and −101° C. with about 35% to 65% of combined styrene.

If desired, small amounts of other materials may be added to the copolymer plastic before sheeting it out into the clear film, as for instance, small amounts of soluble coloring agents, such as blue, red, yellow, green, or other colored dyes, which may be of the oil-soluble type (for example, china marking pencil crayon or oily pencil), colorless light-absorbing substances such as quinine, aesculin, etc., to protect materials or articles wrapped in such a film from the harmful effect of sunlight, ultraviolet light, etc.

Another great advantage of this invention is that the stybutene is highly efficient, even when used in relatively low proportions such as from 2 to 50%, in plasticizing other more brittle types of resins such as polystyrene, which per se cannot be sheeted out into thin, flexible, self-sustaining films.

Other addition agents which may be used include high molecular weight polybutene (preferably 30,000 to 300,000 molecular weight Staudinger), isobutylene-isoprene copolymers (preferably 30,000 to 150,000 molecular weight Staudinger), ("Butyl" rubber), isobutylene-polyolefin copolymers (preferably 30,000 to 150,000 molecular weight Staudinger), isobutylene-polyolefin-styrene tripolymers (preferably 30,000 to 100,000 molecular weight Staudinger), high molecular weight sulfurized alkylated phenol

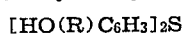

[HO(R)C₆H₃]₂S paraffin wax, high melting point deoiled petroleum, high molecular weight polymethylpentadiene (40,000 molecular weight Staudinger), high molecular weight polyethylene, deproteinized and deashed rubber, cyclized rubber, and aliphatic nitriles that contain 12 to 18 carbon atoms.

Other good uses for films prepared according to this invention, especially the transparent ones, are: use as photographic film, moving picture and sound films and the like, for which purpose these copolymer films are particularly well adapted because they are not explosive, although they will actually burn because they consist entirely of hydrocarbon substances.

A still further very valuable use for the self-supporting films of this invention, and here too the transparent ones are preferred, is as electric insulation material, for instance, for insulating electric cables by the spiral wrapping method or the strip covering method, or for use as insulating materials in electric condensers, especially for radio and other electronic apparatus.

This transparent film may also be used as the tough intermediate layer between two layers of glass in an unbreakable laminated glass sheet material, because it is thermoplastic and has some bonding characteristics, although it may be supplemented, if desired, by a thin bonding film of an even more adhesive stybutene or other copolymer. Tests have indicated that the product does not change color when exposed to ultra-violet light. Such a transparent film will, due to its exceptionally good physical and chemical properties, find many other uses.

Although a machine of the type described above may be used for manufacture of the transparent films in question, it is possible to obtain a substantially transparent film by milling under certain conditions, such as by kneading or milling on a hot rubber mill for about 5 to 30 minutes at a temperature of at least about 80° C. but not higher than about 220° C., followed by a single pass through a cold mill at a temperature of about 30° C. to 50° C. These particular milling conditions permit a substantial amount of molecular orientation necessary to produce a transparent film or sheet.

Another method of preparing films utilizes a doctor blade technique for spreading the polymer which has been fluidized by heating to 150 to 300° C. In this process the hot polymer melt may be charged on to a traveling flexible metal belt, spread by a knife to a thin layer and subsequently cooled and stripped.

Alternatively the polymer may be extruded in a thin sheet or tube using a specially designed extruder head for handling hydrocarbon plastic materials of high molecular weight.

In some instances it may likewise be desirable to make these films by slicing from blocks at ambient or reduced temperature.

Films may also be pressed from a mass of material between metal sheets.

Figure 2:
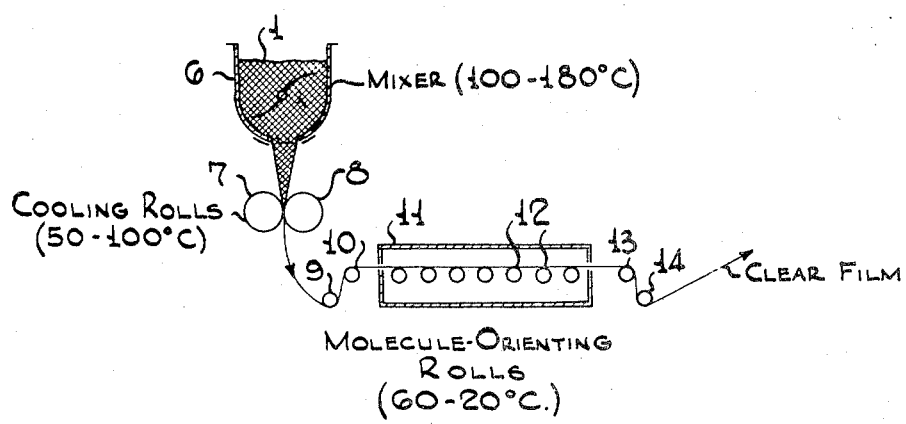
Figure 3:
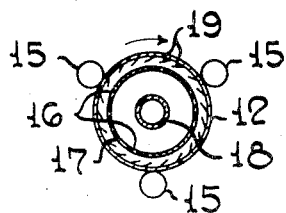

The invention will be better understood from a consideration of the accompanying drawing in which Figure 1 represents schematically the apparatus which may be employed in producing the film by the use of a hot mill and a cold mill, while Figure 2 gives a schematic layout using a mixer, followed by cooling rolls and finally by molecule-orienting rolls, and Figure 3 shows an enlarged cross-section of one of these latter rolls. In these various figures, like reference numerals refer to like parts.

Referring to Figure 1 of the drawing, a batch of hydrocarbon copolymer 1 of the type used according to this invention e. g., a stybutene having characteristics as described hereinabove, is fed to a hot mill such as a conventional rubber mill and consisting of an upper steel roll 2 and a lower steel roll 3. This hot mill is maintained at a temperature above the softening point of the copolymer, but below its decomposition point, generally between the range of about 80–220° C. The upper roll 2 may rotate at a higher speed than the lower roll 3, and hot mixing of the copolymer may be effected by adjusting the spacing of the rolls to permit formation of a sheet of soft, plastic copolymer, and rewinding this sheet around the lower roll 3, in conventional manner, until the desired amount of mixing has taken place, after which the sheet being formed is cut from roll 3 and passed on to a cold mill consisting of a pair of rolls 4 and 5, maintained at a temperature substantially below the softening point of the copolymer, e. g., at a temperature of about 30 to 50° C. The resulting self-supporting film is ready for use.

The alternative modification of carrying out the process illustrated in Figure 2, comprises hot mixing the copolymer 1 in a suitable mixer 6 which may be of the kneader type, maintained at a temperature above the softening point, but below the decomposition point of the copolymer 1, e. g., at a temperature of about 100–180° C. until the desired hot mixing has been effected, e. g., for at least 5 or 10 minutes, after which the hot copolymer is fed through a pair of cooling rolls 7 and 8 maintained at a temperature of about 50–100° C. and spaced so as to produce a plastic sheet of approximately the desired finished thickness or slightly thicker, and then this sheet is passed over suitable guide rolls 9 and 10 and through oven 11 heated by suitable means not shown, e. g., gas burners, steam coils, or electric resistance elements etc., the sheet being carried forward on a number of smooth molecule-orienting rolls 12 driven by a frictional driving means not shown in Figure 2, so arranged and constructed that when the copolymer sheet material expands or contracts, slippage occurs between the driving means and the roll rather than between the roll and the sheet material. These frictionally driven molecule-orienting rolls are maintained at a temperature of about 60–20° C. and serve to remove internal stresses from the copolymer sheet, so that the sheet issuing from oven 11, and preferably passed over suitable guide rolls 13 and 14 is now a clear, transparent, hydrocarbon, self-supporting film.

Figure 3 representing an enlarged cross-section of one of the molecule-orienting rolls 12, shows how this roll may be supported by suitable bearings 15, e. g., ball bearings or the equivalent. The frictional driving means may comprise jets of a suitable fluid e. g., air or water issuing from tangential jet holes 16 drilled through a stationary fluid pipe 17 mounted longitudinally and concentrically within the hollow molecule-orienting roll 12. The fluid supply pipe 17 may be reduced in diameter to a small pipe 18 at the end, through which fluid may be supplied to the larger pipe 17. During operation of the equipment, fluid, e. g., compressed air or water, having the desired temperature for maintaining the molecule-orienting roll 12 at its desired temperature, jets tangentially from pipe 17 through jet holes 16 and impinges tangentially against the inner surface of the hollow molecule-orienting roll 12, which may, if desired, be provided with small vanes 19 or other suitable means for assisting in causing rotation of the roll 12 when fluid impinges on the inner surface thereof.

For the sake of illustration the following examples are given:

EXAMPLE 1

A stybutene was prepared having a 60% styrene content (as determined by carbon hydrogen analysis) by copolymerization at a temperature of about −89° C. using 3 volumes of methyl chloride solvent per volume of hydrocarbon reactants, using as catalyst an 0.6% solution of $AlCl_3$ in methyl chloride and about 0.25 volume of said catalyst solution per volume of hydrocarbon reactants. After the copolymerization was completed which required about 10 minutes, the residual catalyst was hydrolyzed by adding 5% isopropyl alcohol, heating methyl chloride polymer solution to remove solvent and washing with water. The resulting product which was a yellow colored plastic solid having an intrinsic viscosity of 1.1 was subjected to warm milling but gave an opaque sheet.

Another sample of the same product was subjected to hot milling for 15 minutes at a temperature between about 125° C. and about 200° C., and this was followed by a single pass through a cold mill with smooth rolls at about 40° C. The resulting product was a transparent, practically colorless sheet having a thickness of about 0.05 of an inch. Even the opaque sheet resulting from the warm milling, gave a transparent sheet when subjected to a similar hot milling treatment.

EXAMPLE 2

Another stybutene was prepared having a 50% styrene content (as shown by carbon hydrogen analysis), the copolymerization having been carried out at a temperature of −94° to −103° C. using as catalyst an 0.6% solution of $AlCl_3$ in methyl chloride, about 0.25 volume of said catalyst solution per volume of hydrocarbon reactants, and about 2 volumes of methyl chloride as solvent-diluent per volume of hydrocarbon reactants. The resulting product is a plastic which softens at about 60° C. and has an intrinsic viscosity of 1.2.

This stybutene (washed free of catalyst) was mixed in about 15% concentration with about 85% of polystyrene having a molecular weight of about 80,000, in a kneader-type mixer at a temperature of about 130–180° C. for about 15 to 25 minutes and then was sheeted out on a glassmaker's drawing machine such as described above, in which the smooth rolls were maintained at a temperature of about 50° to 25° C. and the speed of drawing being regulated by polarized light to obtain a clear, colorless film about 0.008 inch thick.

A sample of this transparent film just described was subjected to electrical insulation tests at 23° C. and at 50 megacycles and shows the following properties:

Dielectric constant _____ 2.43
Power factor _____ .00043
Loss factor _____ .0011

These are very satisfactory electrical insulating characteristics, and are particularly remarkable since this film contains 85% of polystyrene of 80,000 molecular weight, which alone would be too brittle to permit sheeting out into thin, flexible film.

EXAMPLE 3

This same clear, transparent film of Example 2, and another sample of stybutene made in the same general way as that of Example 1, both showed excellent resistance to moisture penetration, as indicated by the following figures:

EXAMPLE 4

Two different polybutene-stybutene compositions showed the following very low moisture transmission figures when tested in capsule form.

*Water vapor transmission of water filled films in form of capsules*

| Film | Grams/Capsule/24 hours [1] |
|---|---|
| 50% isobutylene polymer+50% isobutylene-styrene copolymer that contained 50% styrene. Copolymer had an intrinsic viscosity of 1.1 | 0.0003 |
| 40% isobutylene polymer+60% isobutylene styrene copolymer that contained 60% styrene. Copolymer had an intrinsic viscosity of 1.0 | 0.00056 |

[1] A loss of 0.001 gram of water vapor is roughly equivalent to 1 g/sq. m./day.

EXAMPLE 5

A sample of stybutene having a 50% combined styrene content and made at a temperature of about −94 to −98° C. was compounded in a concentration of 54.5% by weight with a polystyrene of about 80,000 molecular weight in a concentration of 27.2% and with a 200,000 molecular weight polybutene in about 18.3% concentration by weight. This composition was rolled out into a thin film having a thickness of about 0.1 inch and when tested was found to be substantially free from cold flowing properties. The test consisted of placing a 1 pound weight about 2 inches square on a piece of the film at 120° C., and at the end of two days the sample showed no cold flowing, whereas a similar test on that same type of stybutene alone showed a slight tendency to increase in area, i. e. a slight cold flowing tendency, when tested at 60° C.

In carrying out the copolymerization of reactants such as styrene and isobutylene, it is preferred to use about 0.5 to 0.7% by weight of aluminum chloride in methyl chloride as the catalyst, and such catalyst solutions may be sprayed as a jet either above or below the surface of the reaction liquid, which should preferably be agitated well during the copolymerization reaction.

It is not intended that this invention be limited to the specific materials or conditions which have been recited merely for the sake of illustration, but only by the appended claims in which it is intended to claim all novelty inherent in the invention as well as all modifications coming within the scope and spirit of the invention.

It is claimed:

1. A thin, flexible, substantially transparent self-supporting film of a copolymer of isobutylene with styrene, said copolymer having an intrinsic viscosity between 0.6 and 3 and having a combined styrene content of 50 to 60%.

2. A transparent film as defined in claim 1, having a thickness between 0.0001 and 0.01 inch, said film being colorless and tough.

*Moisture permeability of film*

| (a) PX10⁻⁸ | (b) DX10⁻⁸ | (c) S | (d) grams/sq. M./24 hours | Remarks |
|---|---|---|---|---|
| 0.9 | 9.6 | 0.090 | 0.120 | Polystyrene+isobutylene-styrene copolymer. |
| 1.8 | 27.0 | 0.063 | 0.252 Made at −97° C. | Isobutylene-styrene copolymer that contained 60% styrene by analysis; intrinsic viscosity was 1.1. |

(a) P = cubic centimeters of water vapor (STP) that will pass per second through a film having dimensions of 1 centimeter area and 1 mm. thickness at a P of 1 cm. Hg.
(b) D = cubic centimeters of water vapor (STP) that will pass per second through a cubic centimeter of material when there is a unit concentration gradient across the cube.
(c) S = cubic centimeters of water vapor (STP) that will dissolve in one cubic centimeter of film material at 1 cm. Hg pressure.
(d) The amount of water vapor that will pass through an 0.004" thick film at 70° F. and 85% relative humidity.

3. A transparent and colorless, self-supporting, flexible film consisting of a styrene-isobutylene copolymer having an intrinsic viscosity between 1 and 1.2 and having a combined styrene content between 50 and 60% as determined by carbon and hydrogen analysis.

4. A transparent, solid, flexible, self-supporting film comprising 50 to 98% by weight of polystyrene which is normally too brittle to form thin, flexible, self-sustaining sheets, and comprising also 2 to 50% by weight of a copolymer of isobutylene and styrene having an intrinsic viscosity of 0.6 to 3 and having a combined styrene content of 50 to 60%.

5. A clear, permanently transparent, flexible, self-sustaining solid film consisting of 85 parts by weight of brittle polystyrene and 15 parts by weight of styrene-isobutylene copolymer which has a combined styrene content of 50% as determined by carbon and hydrogen analysis, and which has an intrinsic viscosity of 1.2.

6. A product according to claim 5 wherein the polystyrene has a molecular weight of 80,000.

WILLIAM J. SPARKS.
DAVID W. YOUNG.

REFERENCES CITED

The following references are of record in the file of this patent:

UNITED STATES PATENTS

| Number | Name | Date |
| --- | --- | --- |
| 1,966,856 | Groff | July 17, 1934 |
| 2,067,025 | Schmidt | Jan. 5, 1937 |
| 2,200,429 | Perrin et al. | May 3, 1940 |
| 2,213,423 | Weezevick | Sept. 3, 1940 |
| 2,219,700 | Perrin et al. | Oct. 29, 1940 |
| 2,265,436 | Loblein | Dec. 9, 1941 |
| 2,274,749 | Smyers | Mar. 3, 1942 |
| 2,320,115 | Young | May 25, 1943 |
| 2,334,233 | Wood | Nov. 16, 1943 |

FOREIGN PATENTS

| Number | Country | Date |
| --- | --- | --- |
| 513,521 | Great Britain | Oct. 16, 1939 |